US006957800B2

United States Patent
Wingett et al.

(10) Patent No.: US 6,957,800 B2
(45) Date of Patent: Oct. 25, 2005

(54) VALVE ASSEMBLY HAVING A LINEAR MOTOR ACTUATOR

(75) Inventors: Paul T. Wingett, Mesa, AZ (US); Calvin C. Potter, Mesa, AZ (US); Sharon K. Brault, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 51 days.

(21) Appl. No.: 10/777,501

(22) Filed: Feb. 10, 2004

(65) Prior Publication Data

US 2005/0173663 A1   Aug. 11, 2005

(51) Int. Cl.[7] ............................................. F16K 31/02
(52) U.S. Cl. .................. 251/129.01; 251/92; 251/305; 310/328
(58) Field of Search ............................ 251/129.01, 92, 251/93, 305; 310/328

(56) References Cited

U.S. PATENT DOCUMENTS

| 1,040,359 A | 10/1912 | Latimer |
| 1,668,278 A | 5/1928 | Langdon |
| 4,733,595 A * | 3/1988 | Oberly ............................ 89/8 |
| 5,592,905 A | 1/1997 | Born |
| 5,847,474 A | 12/1998 | Gruden et al. |

* cited by examiner

Primary Examiner—Edward K. Look
Assistant Examiner—John K. Fristoe, Jr.
(74) Attorney, Agent, or Firm—Ingrassia Fisher & Lorenz

(57) ABSTRACT

A valve actuator assembly that is implemented in a fully-electric configuration includes two rails and an armature that is moveably disposed between, and electrically coupled to, each of the rails. The armature is configured to couple to a valve element and is moveable between at least a first position and a second position, to thereby move the valve element to at least the open and closed positions, respectively. Upon application of an electrical potential of a first or second polarity across the rails, a current flows through the armature in a first or a second direction, respectively, to thereby generate a Lorentz force. The Lorentz force acts on the armature to move it to the first or second position, and thus move the valve element to the open or closed position, respectively.

20 Claims, 3 Drawing Sheets

VALVE ASSEMBLY HAVING A LINEAR MOTOR ACTUATOR

FIELD OF THE INVENTION

The present invention relates to valves and valve actuators and, more particularly, to a valve that includes a linear drive motor actuator.

BACKGROUND OF THE INVENTION

Valves are used in myriad systems to control the flow of fluid to and from one or more systems or components. In many systems, these valves are operated using some sort of remotely controlled valve actuator assembly. Such actuator assemblies include a torque source that is used to move the valve between its open and closed positions. The torque source may be, for example, a hydraulic actuator, a pneumatic actuator, an electrical actuator, such as solenoids, and motors, or a combination of hydraulic, pneumatic, and electrical components.

For example, many valves used in aircraft include electro-pneumatic type of actuator assemblies. Such actuator assemblies are an agglomeration of numerous individual components that include, for example, one or more solenoids and/or one or more torque motors that are selectively energized to direct pressurized air from, for example, a bleed air source, to or away from a valve operator, via one or more air pressure regulator valves and conduits. Although these valve actuator assemblies are safe and reliable, the actuator assemblies also present certain drawbacks. For example, a valve actuator assembly constructed of numerous individual components and/or subassemblies may increase overall weight, size, and cost of the valve to which the actuator assembly is coupled. In addition, the relatively large number of parts may, among other things, adversely impact the overall reliability and performance of the valve actuator assembly.

Hence, there is a need for a valve actuator assembly that is not constructed of numerous individual components and/or subsystems, and/or reduces valve and valve actuator assembly weight, and/or reduces valve and valve actuator assembly cost, and/or improves valve and valve actuator reliability as compared to present valve and valve actuator assemblies. The present invention addresses one or more of these needs.

SUMMARY OF THE INVENTION

The present invention provides a valve actuator assembly that is implemented in a fully-electric configuration, and therefore does not use any source of pneumatic or hydraulic pressure to position the valve. The valve actuator assembly is constructed of less components as compared to present electro-pneumatic and electro-hydraulic actuator assemblies, and is therefore less complex and relatively more reliable.

In one embodiment, and by way of example only, a valve assembly includes a valve body, a valve element, and a valve actuator. The valve body has an inlet port, an outlet port, and a flow passage extending therebetween. The valve element is mounted at least partially within the flow passage and is moveable between an open position and a closed position to thereby control fluid flow therethrough. The valve actuator is mounted proximate the valve body and includes two rails, an armature, a first armature lock, and a second armature lock. The rails extend substantially parallel to one another. The armature is moveably disposed at least partially between, and is electrically coupled to, each of the rails. The armature is also coupled to the valve element and is moveable between at least a first position and a second position, to thereby move the valve element to at least the open and closed positions, respectively. The first armature lock is disposed adjacent at least one of the rails and is configured to lock the armature in the first position. The second armature lock is disposed adjacent at least one of the rails and is configured to lock the armature in the second position. A current flows through the armature in a first or a second direction upon application of an electrical potential of a first or second polarity, respectively, across the rails, to thereby generate a Lorentz force and move the armature to the first or second position, respectively, and the valve element to the open or closed position, respectively.

In another exemplary embodiment, a valve actuator assembly includes two rails, an armature, a first armature lock, and a second armature lock. The rails extend substantially parallel to one another. The armature is moveably disposed at least partially between, and is electrically coupled to, each of the rails. The armature is configured to couple to a valve element and is moveable between at least a first position and a second position, to thereby move the valve element to at least the open and closed positions, respectively. The first armature lock is disposed adjacent at least one of the rails and is configured to lock the armature in the first position. The second armature lock is disposed adjacent at least one of the rails and is configured to lock the armature in the second position. A current flows through the armature in a first or a second direction upon application of an electrical potential of a first or second polarity, respectively, across the rails, to thereby generate a Lorentz force and move the armature to the first or second position, respectively, and the valve element to the open or closed position, respectively.

Other independent features and advantages of the preferred valve actuator will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the described embodiment is not limited to use in conjunction with a specific type of valve. Thus, although the present embodiment is, for convenience of explanation, depicted and described as being implemented in a butterfly valve, it will be appreciated that it can be implemented in various other types of valves.

Figure 1:
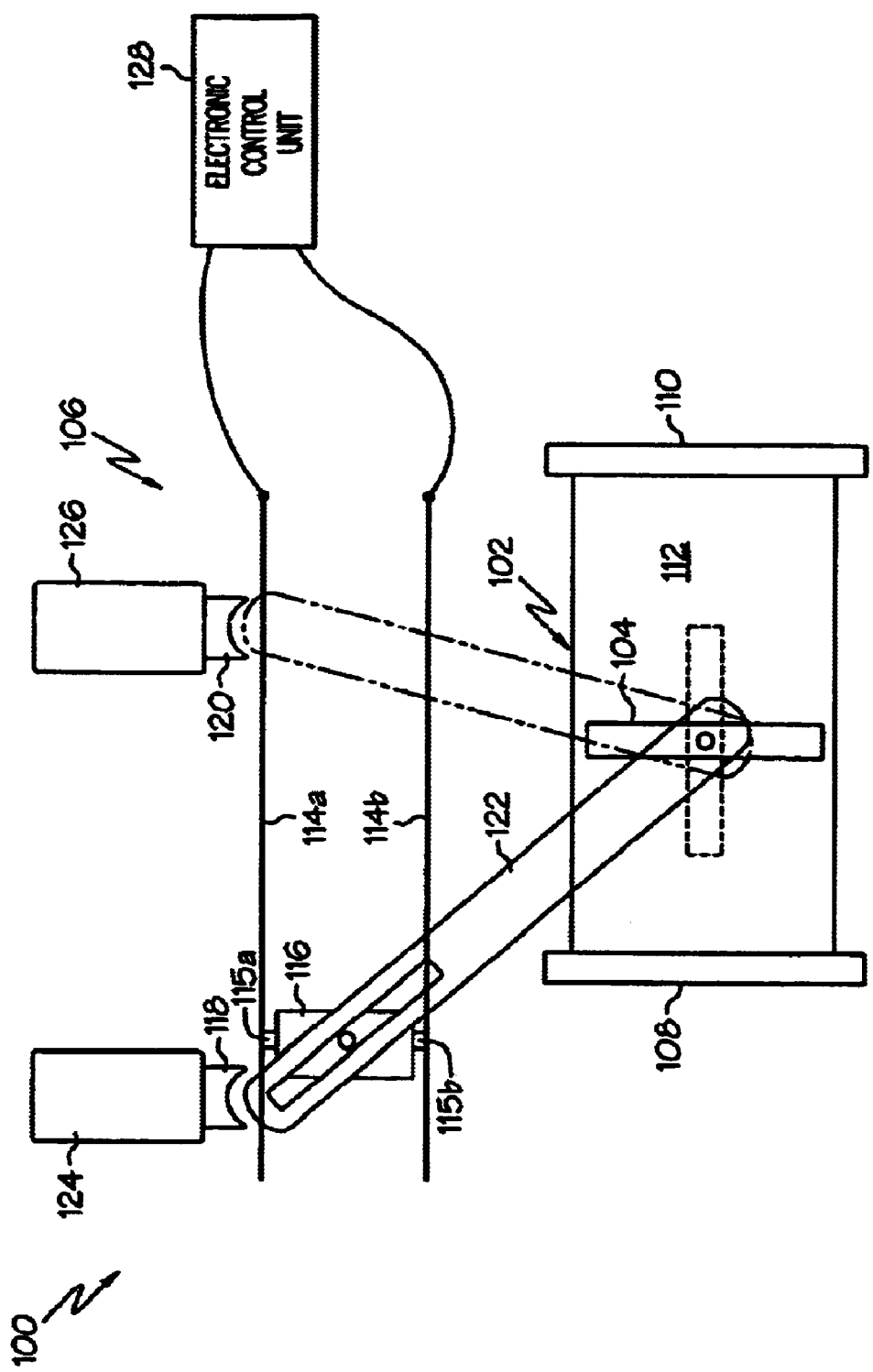
FIG. 1 is a simplified schematic representation of a valve assembly coupled to a valve actuator according to an exemplary embodiment of the present invention.

With reference now to FIG. 1, a schematic representation of a valve assembly 100 according to an exemplary preferred embodiment is shown. The valve assembly 100 includes a valve body 102, a valve element 104, and a valve actuator 106. The valve body 102 includes an inlet port 108, an outlet port 110, and a flow passage 112 that extends between the inlet 108 and outlet 110 ports, and through which fluid directed into the fluid inlet port 108 may flow.

The valve element 104 is mounted within the flow passage 112, in the depicted embodiment, the valve element 104 is a butterfly valve; however, it will be appreciated that this is merely exemplary of a particular embodiment, and that various other types of valve elements could also be used. No matter the particular type of valve element 104 that is used, the valve element 104 is moveably mounted within the flow passage 112. In the depicted embodiment, the valve element 104 is rotationally mounted, and is moveable between a closed position and a full-open position. In the closed position (shown in FIG. 1), fluid flow through the flow passage 112 is blocked. Conversely, in the full-open position (shown in phantom in FIG. 1), or at a position between the closed and full-open position, fluid may flow through the flow passage 112. In some embodiments in which the valve element is not a butterfly valve, the flow rate through the flow passage 112 may be controlled by controlling the position of the valve element 104. In the depicted embodiment, however, the valve assembly 100 is configured such that the valve element 104 is moveable between the closed and full-open positions.

The valve actuator 106 is coupled to the valve element and, upon receipt of appropriate valve position commands, moves the valve element 104 to the closed or open positions. The valve actuator 106 is configured as a linear motor that operates on the principle of the Lorentz force. In particular, the valve actuator 106 includes two electrically conductive rails 114a, 114b, an armature 116, a closed lock 118, and an open lock 120. The rails 114a, 114b are constructed of any one of numerous electrically conductive materials such as, for example, copper. As will be described in more detail further below, based on the specific valve command received, current flows through each of the rails 114a, 114b in a specific direction, which generates a magnetic field. The magnetic field, in combination with the current flow, generates a force in an appropriate direction to move the valve element 104 to the commanded position.

The armature 116 is disposed between, and is electrically coupled to, each of the rails 114a, 114b. In the depicted embodiment, the armature 116 is coupled to each of the rails 114a, 114b via a pair of resistive contacts 115a, 115b that are coupled between the armature 116 and the rails 114a, 114b. It will be appreciated, however, that this is merely exemplary and that the armature 116 could be electrically coupled to the rails 114a, 114b in various other ways. For example, a resistive contact could extend through the armature 116 to thereby electrically couple the armature 116 to the rails 114a, 114b. The resistive contacts 115a, 115b may be made of any one of numerous types of resistive conductor or semiconductor material such as, for example, carbon.

In addition to being electrically coupled to the rails, the armature 116 is also coupled to the valve element 104. Thus, as the armature moves between a first position (shown in FIG. 1) and a second position (shown in phantom in FIG. 1), it in turn causes the valve element 104 to move from the closed position to the full-open position, respectively. In the depicted embodiment, the armature 116 is coupled to the valve element 104 via a link 122. However, it will be appreciated that this is merely exemplary, and that the armature 116 could be coupled directly to the valve element 104, or via any one of numerous other elements. Although the armature 116 may be constructed of any one of numerous known materials, in a particular preferred embodiment it is constructed of aluminum.

The closed 118 and open 120 locks are each disposed adjacent one of the rails 114a, 114b. In the depicted embodiment, the locks 118, 120 are both disposed adjacent the same rail 114a. It will be appreciated, however, that this is merely exemplary and that the locks 118, 120 could be disposed adjacent different rails 114a or 114b. The locks 118, 120 are also spaced apart from one another at different positions along the rail 114a (or rails 114b). The closed lock 118 is disposed at a position (e.g., the first position) that coincides with the position of the armature 116 when the valve element 104 is in the closed position. Similarly, the open lock 120 is disposed at a position (e.g., the second position) that coincides with the position of the armature 116 when the valve element 104 is in the full-open position. Thus, the valve element 104 may be locked in either its closed or full-open position. The locks 118, 120 are each preferably spring-loaded latching solenoids that are normally biased toward the locked position, and are energized to move to the unlocked position. However, various other types of locks and lock configurations could also be used, depending on system configuration and requirements.

As FIG. 1 also shows, a position sensor 124 and 126 is disposed adjacent to, or is formed integrally with, one of the locks 118 and 120, respectively. The position sensors 124 and 126 sense when the armature 116 is in the first position and the second position, respectively, which corresponds to the valve element 104 being in the closed and the full-open position, respectively. The position sensors 124, 126 may be any one of numerous types of position sensors including, but not limited to, optical sensors, eddy current sensors, and switches. In a particular preferred embodiment, however, the sensors 124, 126 are each switches.

Figure 2:
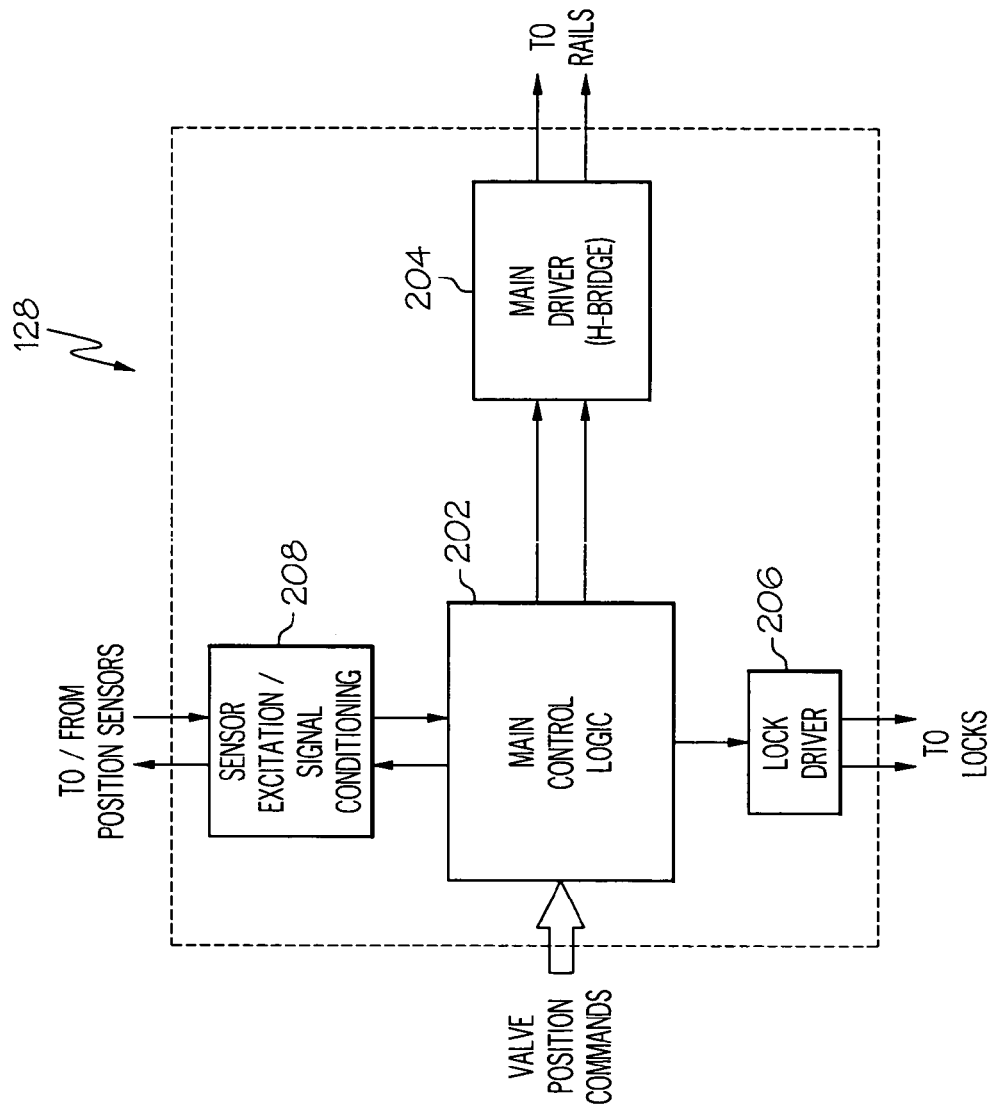
FIG. 2 is a function block diagram of an exemplary embodiment of a control circuit that may be used to control the exemplary valve actuator shown in FIG. 1.

The rails 114a, 114b, the locks 118, 120, are each selectively energized via a control circuit, such as the depicted electronic control unit (ECU) 128. The ECU is also preferably configured to supply excitation power to, and receive valve position signals from, the position sensors 124, 126. A functional block diagram of a particular preferred embodiment of the ECU 128 is shown in FIG. 2, and will now be described in more detail.

The ECU 128 includes four main functional circuit blocks—the main control logic 202, a main driver circuit 204, a lock driver circuit 206, and a sensor excitation/signal conditioning circuit 208. The main control logic 202 is adapted to receive valve position command signals from, for example, a non-illustrated aircraft controller. In turn, the ECU 128 supplies appropriate output signals to the main driver circuit 204 and the lock driver circuit 206. As a result, the armature 116 is unlocked, moved to the commanded position, and then latched in the commanded position.

The main driver circuit 204 is preferably an H-bridge driver circuit. As is generally known, an H-bridge circuit may be configured to supply a DC voltage potential of different relative polarities. Thus, the H-bridge may supply either a positive or negative DC voltage potential between the rails 114a, 114b, which will in turn cause a DC current to flow in different directions through the rails 114a, 114b. As will be described in more detail further below, and as was alluded to previously, the movement direction of the armature 116 is controlled by controlling the direction of current flow through the rails 114a, 114b. Although an H-bridge circuit configuration is preferred, it will be appreciated that various other types of circuits could also be used. It will additionally be appreciated that the main driver circuit 204 can be formed integrally with, or separate from, the main control logic 202.

The lock driver circuit 206, as was alluded to above, receives one or more signals from the main control logic 202. In response to the received signal, the lock driver circuit 206 selectively energizes or de-energizes either the closed 118 or open 120 lock, to thereby disengage or engage, respectively, the armature 116. In a particular preferred embodiment, in which the locks 118, 120 are configured as energize-to-disengage type latching solenoid locks, the lock driver circuit 206 is configured to energize each lock 118, 120 when it is desired to move it to the unlocked (or disengaged) position, and to de-energize each lock 118, 120 when it is desired to move it to the locked (or engaged) position. As with the main driver circuit 204, the lock driver circuit 206 may be formed integrally with, or separate from, the main control logic 202.

The sensor excitation/signal condition circuit 208 is used to supply excitation power to, and to receive position signals from, each of the position sensors 124, 126. In particular, the sensor excitation/signal conditioning circuit 208 receives power from the main control logic 202 and, in turn, supplies excitation power of the appropriate voltage and current magnitudes to each of the position sensors 124, 126. The sensor excitation/signal conditioning circuit 208 also appropriately filters and/or other conditions the position signals supplied from each position sensor 124, 126, and supplies the conditioned sensor signals to the main control logic 202. As with the other circuits described above, it will be appreciated that the sensor excitation/signal conditioning circuit 208 could be formed integrally with, or separate from, the control logic 202. It will additionally be appreciated that this circuit 208 could be configured to receive power from a power source external to the control logic 202.

Having described the valve actuator 106 and ECU 128 in detail from a structural viewpoint, and generally from a functional viewpoint, a detailed description of the function implemented by the valve actuator 106 and ECU 128 will now be provided. In doing so, reference should be made, as appropriate, to FIGS. 3 and 4, and as needed to FIGS. 1 and 2. Moreover, the following description is premised on the assumption that the valve element 104 is in the closed position, and the armature 116 is locked in the corresponding position.

When it is desired to move the valve element 104 from the closed position to the open position, an appropriate valve position command signal (e.g., valve open command signal) is supplied to the ECU 128, and in particular to the main control logic 202 in the ECU 128. In response to the valve open command signal, the main control logic 202 supplies appropriate control signals to the main diver circuit 204 and the lock driver circuit 206. The lock driver circuit 206, in response to the control signal received from the main control logic 202, supplies an appropriate signal to the closed lock 118, causing it to move to the unlocked position, thereby disengaging the armature 116. Once the closed lock 118 disengages the armature 116, the armature 116 is free to move upon receipt of an appropriate drive force.

Figure 3:
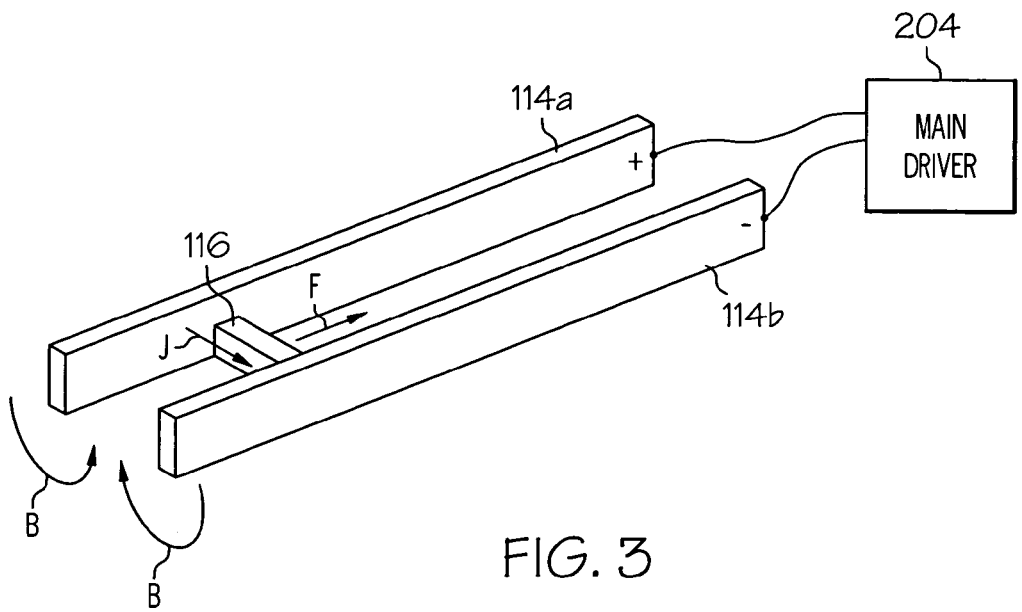
FIGS. 3 and 4 are each simplified representations of a portion of the valve actuator shown in FIG. 1, depicting its operation to move the valve assembly to a commanded position.

At substantially the same time as the lock driver circuit 206 causes the closed lock 118 to disengage the armature 116, the main driver circuit 204, in response to the control signal it receives from the main control logic 202, applies a DC voltage potential between the rails 114a, 114b. This DC voltage potential, as shown in FIG. 3, causes a current to flow through the rails 114a, 114b and the armature 116 in the direction of the arrows (J). In addition, as is generally known, current flow through the rails 114a, 114b will generate a magnetic field flux in the direction of the arrows (B). According to the well-known Lorentz law, a Lorentz force (F) is generated that will act on the armature 116, and cause it to move. The generated Lorentz force ( ) will have a magnitude and direction in accordance with the following equation:

$$\overline{F}=\overline{J}\times\overline{B},$$

where $\overline{J}$ is the current density, and $\overline{B}$ is the magnetic flux density. Thus, as shown in FIG. 3, the generated force (F) acting on the armature 116 will cause it to move, once it is unlocked, from the first position to the second position, thereby moving the valve element 104 from the closed position to the open position.

At some point after the armature 116 begins moving, the closed position sensor 124 will supply a signal to the ECU 128 indicating that the armature 116 is no longer in the first position, and thus that the valve element 104 is no longer in the closed position. Then, when the armature 116 reaches the second position, or at some point proximate thereto, the open position sensor 126 will supply a signal to the ECU 128 indicating that the valve element 104 is in, or proximate to, the open position. In response to the signal from the open position sensor 126, the ECU 128 will supply appropriate control signals to the main driver circuit 204 and the lock driver circuit 206. The lock driver circuit 206, in response to the control signals it receives from the ECU 128, will cause the open lock 120 to engage the armature 116. The main driver circuit 204, in response to the control signals it receives from the ECU 128, will remove the DC voltage potential from the rails 114a, 114b, which ceases current flow through the rails 114a, 114b and the armature 116. Thus, the Lorentz force (F) is no longer generated, and no longer acts on the armature 116.

Figure 4:
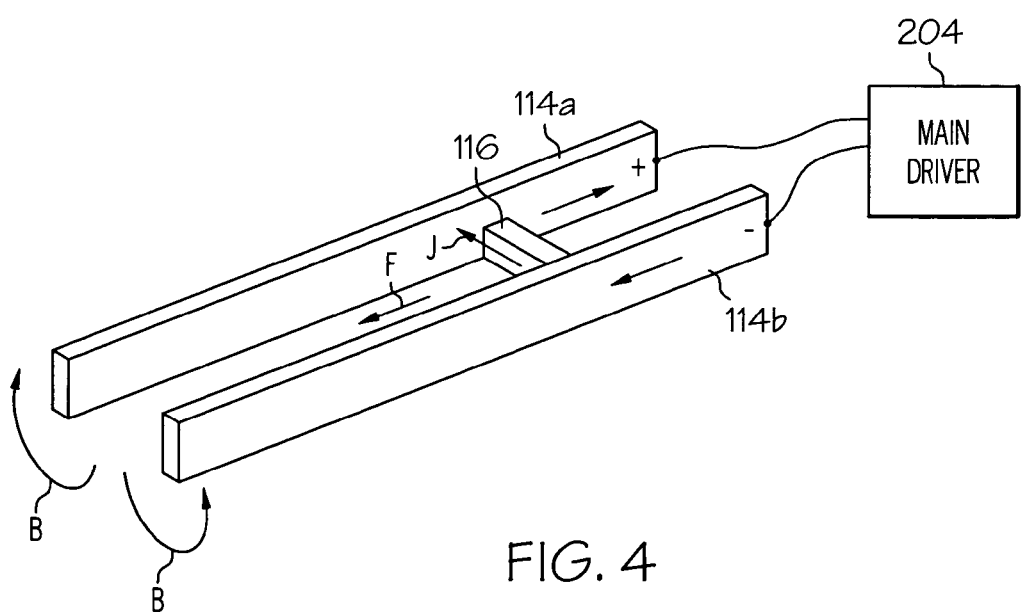

When it is desired to move the valve element 104 from the open position to the closed position, an appropriate valve position command signal (e.g., valve close command signal) is supplied to the main control logic 202 in the ECU 128. In response to the valve close command signal, the main control logic 202 supplies appropriate control signals to the main diver circuit 204 and the lock driver circuit 206. In general, the operation of the valve actuator 106 to move the valve element 104 from the open position to the closed position is the same as it is to move the valve element 104 from the closed to the open position. As such, this operation will not be described in detail. It will be appreciated, however, that the main driver circuit 204 supplies a DC voltage potential between the rails 114a, 114b that is of the same magnitude, but of opposite polarity, to that which is supplied to move the valve element from the closed to the open position. Thus, as shown in FIG. 4, the current flow through the rails 114a, b and armature (J), the generated magnetic field flux (B), and the generated Lorentz force (F) are all in directions opposite to that shown in FIG. 3.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A valve assembly, comprising:
   a valve body having an inlet port, an outlet port, and a flow passage extending therebetween;
   a valve element mounted at least partially within the flow passage and moveable between an open position and a closed position to thereby control fluid flow therethrough; and
   a valve actuator mounted proximate the valve body, the valve actuator including:
   two rails extending substantially parallel to one another,
   an armature moveably disposed at least partially between, and electrically coupled to, each of the rails, the armature coupled to the valve element and moveable between at least a first position and a second position, to thereby move the valve element to at least the open and closed positions, respectively,
   a first armature lock disposed adjacent at least one of the rails and configured to selectively lock the armature in the first position, and
   a second armature lock disposed adjacent at least one of the rails and configured to selectively lock the armature in the second position,
   wherein a current flows through the armature in a first or a second direction upon application of an electrical potential of a first or second polarity, respectively, across the rails, to thereby generate a Lorentz force and move the armature to the first or second position, respectively, and the valve element to the open or closed position, respectively.

2. The valve assembly of claim 1, further comprising:
   a first position sensor disposed proximate at least one of the rails and configured to sense at least when the armature is in the first position and supply a position signal representative thereof; and
   a second position sensor disposed proximate at least one of the rails and configured to sense at least when the armature is in the second position and supply a position signal representative thereof.

3. The valve assembly of claim 1, further comprising:
   a control circuit adapted to receive valve position command signals and operable, in response thereto, to supply the electrical potential of the first or second polarity across the rails.

4. The valve assembly of claim 3, wherein:
   the control circuit is further operable, in response to the valve position command signals, to supply one or more lock driver signals;
   the first and second armature locks are each moveable between a locked position and an unlocked position, to thereby engage and disengage the armature, respectively; and
   the first and second armature locks each include a solenoid that moves its associated lock, upon receipt of the lock driver signal, to the unlocked position.

5. The valve assembly of claim 4, wherein the first and second armature locks each further include a bias spring configured to supply a bias force that biases its associated lock toward the locked position.

6. The valve assembly of claim 4, wherein the control circuit further comprises a lock driver circuit coupled to receive one or more of the control signals from the main control circuit and operable, in response thereto, to supply the one or more lock driver signals.

7. The valve assembly of claim 3, wherein the control circuit comprises:
   a main control circuit adapted to receive the valve position command signals and operable, in response thereto, to supply one or more control signals;
   a main driver circuit coupled to receive one or more of the control signals from the main control circuit and operable, in response thereto, to supply the electrical potential of the first or second polarity across the rails.

8. The valve assembly of claim 1, further comprising:
   a link coupled between the armature and the valve element, whereby the armature is coupled to the valve element.

9. The valve assembly of claim 1, wherein the valve element is a butterfly valve element.

10. A linear drive motor actuator for moving a valve element between an open and a closed position, the actuator comprising:
    two rails extending substantially parallel to one another;
    an armature moveably disposed at least partially between, and electrically coupled to, each of the rails, the armature configured to couple to a valve element and moveable between at least a first position and a second position, to thereby move the valve element to at least the open and closed positions, respectively;
    a first armature lock disposed adjacent at least one of the rails and configured to selectively lock the armature in the first position; and
    a second armature lock disposed adjacent at least one of the rails and configured to selectively lock the armature in the second position,
    wherein a current flows through the armature in a first or a second direction upon application of an electrical potential of a first or second polarity, respectively, across the rails, to thereby generate a Lorentz force and move the armature to the first or second position, respectively, and the valve element to the open or closed position, respectively.

11. The actuator of claim 10, further comprising:
    a first position sensor disposed proximate at least one of the rails and configured to sense at least when the armature is in the first position and supply a position signal representative thereof; and
    a second position sensor disposed proximate at least one of the rails and configured to sense at least when the armature is in the second position and supply a position signal representative thereof.

12. The actuator of claim 10, further comprising:
    a control circuit adapted to receive valve position command signals and operable, in response thereto, to supply the electrical potential of the first or second polarity across the rails.

13. The actuator of claim 12, wherein the control circuit comprises:
    a main control circuit adapted to receive the valve position command signals and operable, in response thereto, to supply one or more control signals;
    a main driver circuit coupled to receive one or more of the control signals from the main control circuit and operable, in response thereto, to supply the electrical potential of the first or second polarity across the rails.

14. The actuator of claim 10, wherein:
    the control circuit is further operable, in response to the valve position command signals, to supply one or more lock driver signals;

the first and second armature locks are each moveable between a locked position and an unlocked position, to thereby engage and disengage the armature, respectively; and the first and second armature locks each include a solenoid that moves its associated lock, upon receipt of the lock driver signal, to the unlocked position.

15. The actuator of claim 14, wherein the first and second armature locks each further include a bias spring configured to supply a bias force that biases its associated lock toward the locked position.

16. The actuator of claim 14, wherein the control circuit further comprises a lock driver circuit coupled to receive one or more of the control signals from the main control circuit and operable, in response thereto, to supply the one or more lock driver signals.

17. The actuator of claim 10, further comprising:
a link coupled between the armature and the valve element, whereby the armature is coupled to the valve element.

18. The actuator of claim 10, wherein the valve element is a butterfly valve element.

19. A linear drive motor actuator for moving a valve element between an open and a closed position, the actuator comprising:
two rails extending substantially parallel to one another;
an armature moveably disposed at least partially between, and electrically coupled to, each of the rails, the armature configured to couple to a valve element and moveable between at least a first position and a second position, to thereby move the valve element to at least the open and closed positions, respectively;
a first position sensor disposed proximate at least one of the rails and configured to sense at least when the armature is in the first position and supply a position signal representative thereof;
a second position sensor disposed proximate at least one of the rails and configured to sense at least when the armature is in the second position and supply a position signal representative thereof;
a first armature lock disposed adjacent at least one of the rails and configured to lock the armature in the first position; and
a second armature lock disposed adjacent at least one of the rails and configured to lock the armature in the second position,
wherein a current flows through the armature in a first or a second direction upon application of an electrical potential of a first or second polarity, respectively, across the rails, to thereby generate a Lorentz force and move the armature to the first or second position, respectively, and the valve element to the open or closed position, respectively.

20. The actuator of claim 19, further comprising:
a control circuit adapted to receive valve position command signals and operable, in response thereto, to supply the electrical potential of the first or second polarity across the rails.

* * * * *